US008959043B2

(12) United States Patent
Ferrucci et al.

(10) Patent No.: US 8,959,043 B2
(45) Date of Patent: *Feb. 17, 2015

(54) FACT CHECKING USING AND AIDING PROBABILISTIC QUESTION ANSWERING

(75) Inventors: David A. Ferrucci, Yorktown Heights, NY (US); David C. Gondek, Hawthrone, NY (US); Aditya A. Kalyanpur, Westwood, NJ (US); Adam P. Lally, Cold Spring, NY (US); Siddharth Patwardhan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/600,628

(22) Filed: Aug. 31, 2012

(65) Prior Publication Data

US 2012/0330882 A1    Dec. 27, 2012

Related U.S. Application Data

(63) Continuation of application No. 13/247,527, filed on Sep. 28, 2011.

(60) Provisional application No. 61/387,666, filed on Sep. 29, 2010.

(51) Int. Cl.
| | |
|---|---|
| *G06F 17/00* | (2006.01) |
| *G06N 5/02* | (2006.01) |
| *G06F 9/44* | (2006.01) |
| *G06N 7/02* | (2006.01) |

(Continued)

(52) U.S. Cl.
CPC .................................. *G06N 7/005* (2013.01)
USPC ............................................. 706/46; 706/52

(58) Field of Classification Search
CPC .............................. G06N 5/02; G06N 5/022
USPC .................................... 706/45, 46, 61
See application file for complete search history.

(56) References Cited

U.S. PATENT DOCUMENTS

| | | | |
|---|---|---|---|
| 2005/0043922 A1* | 2/2005 | Weidl et al. | 702/183 |
| 2007/0005520 A1* | 1/2007 | Eick et al. | 706/12 |
| 2007/0255666 A1* | 11/2007 | Sanfilippo et al. | 706/12 |

(Continued)

OTHER PUBLICATIONS

Saquete, E. et al. "Splitting complex temporal questions for question answering systems." Proceedings of the 42nd Annual Meeting on Association for Computational Linguistics. Association for Computational Linguistics, 2004. 7 pages.*

(Continued)

*Primary Examiner* — Jeffrey A Gaffin
*Assistant Examiner* — Benjamin Buss
(74) *Attorney, Agent, or Firm* — Scully, Scott, Murphy & Presser, P.C.; William Stock, Esq.

(57) ABSTRACT

A system and a computer program product for verifying a statement are provided. The system is configured to receive a statement. The system is configured to decompose the received statement into one or more sets of question and answer pairs. The system is configured to determine a confidence value of each answer in the one or more question and answer pair sets. The system is configured to combine the determined confidence values. The combined confidence values represent a probability that the received statement is evaluated as true.

9 Claims, 5 Drawing Sheets

(51) Int. Cl.
   *G06N 7/06* (2006.01)
   *G06N 7/00* (2006.01)

(56) References Cited

U.S. PATENT DOCUMENTS

2010/0023469 A1* 1/2010 Farnham ................. 706/46
2011/0066587 A1   3/2011 Ferrucci et al.
2011/0125734 A1* 5/2011 Duboue et al. ............ 707/723

OTHER PUBLICATIONS

Hartrumpf, S. et al. "Efficient question answering with question decomposition and multiple answer streams." In Evaluating Systems for Multilingual and Multimodal Information Access: 9th Workshop of the Cross-Language Evaluation Forum, CLEF 2008, Sep. 17-19, 2008. Lecture Notes in Computer Science (LNCS) vol. 5706, pp. 421-428.*

Ittycheriah, A. et al. IBM's statistical question answering system—TREC-11. IBM Thomas J Watson Research Center Yorktown Heights NY, 2006.*

Walas, M. et al. "Named entity recognition in a Polish question answering system." Intelligent Information Systems, Jun. 2010. pp. 181-191.*

Hartrumpf, S. "Semantic decomposition for question answering." In Proceedings of the 18th European Conference on Artificial Intelligence (ECAI), 2008, pp. 313-317.*

Katz, B. et al. "Syntactic and semantic decomposition strategies for question answering from multiple resources." Proceedings of the AAAI 2005 workshop on inference for textual question answering. 2005. pp. 35-41.*

Lacatusu, F. et al. "Impact of question decomposition on the quality of answer summaries." Proceedings of the Fifth Language Resources and Evaluation Conference. 2006. pp. 1147-1152.*

Lita, L. et al. "Instance-Based Question Answering: A Data-Driven Approach." in EMNLP, pp. 396-403. 2004.*

Brill, E. et al. "Data-Intensive Question Answering." Trec. 2001. 8 pages.*

Mutuszek, C. et al. "Searching for common sense: populating Cyc™ from the web." AAAI. 2005. pp. 1430-1435.*

Glockner, I. et al. "RAVE: A Fast Logic-Based Answer Validator". CLEF 2008, LNCS 5706, pp. 468-471, 2009.*

Moriceau, V. et al. "FIDJI: using syntax for validating answers in multiple documents". InfRetrieval (2010) 13:507-533. DOI 10.1007/s10791-010-9131-y.*

Rodrigo, A. "Overview of the Answer Validation Exercise 2008". CLEF 2008, LNCS 5706, pp. 296-313, 2009.*

Google, "define:fact"—accessed Jul. 1, 2014.*

Androutsopoulos, G.D. Ritchie, "Natural Language interfaces to databases—an introduction", Natural Language Engineering, 1 (1): 29-81, 1995, Cambridge University Press.

Hoffart, Johannes, "Robust Disambiguation of Named Entities in Text", Proceedings of the 2011 Conference on Empirical Methods in Natural Language Processing; Association for Computational Linguistics, Edinburgh, Scotland, UK, Jul. 2011, pp. 782-792.

"Named Entity Disambiguation", Alchemy API, 2011, Morristown, New Jersey, US, http://www.alchemyapi.com/api/entity/disamb/html, last printed Aug. 1, 2011.

* cited by examiner

FACT CHECKING USING AND AIDING PROBABILISTIC QUESTION ANSWERING

CROSS-REFERENCE TO RELATED APPLICATIONS

This application claims the benefit of U.S. Provisional Application Ser. No. 61/387,666, filed Sep. 29, 2010 for "Fact Checking using and aiding Probabilistic Question Answering." The subject matter of U.S. Provisional Application Ser. No. 61/387,666 is hereby fully incorporated herein by reference. This application is also a continuation of U.S. patent application Ser. No. 13/247,527, filed Sep. 28, 2011, the entire content and disclosure of which is incorporated herein by reference.

BACKGROUND

The present application generally relates to verifying a statement. More particularly, the present application relates to an automated system and method for evaluating whether a statement is true or not automatically by using an artificial intelligent computer.

Fact checking refers to evaluating truthfulness of a statement. Currently, the fact checking is performed with respect to at least one resource. The resource includes, but is not limited to: unstructured information and structured information. Unstructured information includes, but is not limited to: a collection of documents, web pages, etc. Structured information includes, but is not limited to: tables, databases, ontologies, etc. The truthfulness of a statement is determined with respect to the resource(s) used for the fact checking. The time and resources needed to conduct the fact checking is large, e.g., 80 full-time workers to perform only the fact checking of newspaper articles before publishing newspaper articles. However, due to the manual operation of the fact checking, the current fact checking method (e.g., manually contacting an expert in the area of the statement) is error-prone. For example, daily newspapers always publish corrections of prior newspaper publications.

SUMMARY OF THE INVENTION

The present disclosure describes a system and computer program product for verifying a statement.

In one embodiment, a system for verifying a statement is provided. The system comprises a first computing system which includes at least one memory device and at least one processor connected to the memory device. The first computing system is configured to receive a statement. The first computing system is configured to decompose the received statement into one or more sets of question and answer pairs. The first computing system is configured to compute a confidence value of each answer in the one or more question and answer pair sets. The first computing system is configured to combine the determined confidence values. The combined confidence values represent a probability that the received statement is evaluated as true.

In a further embodiment, the first computing system is further configured to identify words and phrases in the received statement. The first computing system is further configured to replace the identified words and phrases in the received statement with one or more words that can be used to create questions in the one or more question and answer pair sets. The first computing system is configured to indicate the identified words and phrases in the received statement as answers in the one or more question and answer pair sets.

In a further embodiment, to decompose the received statement, the first computing system is configured to identify one or more of: at least one clause in the received statement, at least one syntactic label in the received statement, at least one conjunction in the received statement, configuration information in the received statement, at least one pre-modifier or post-modifier in the received statement, and at least one relative qualifier in the received statement. The first computing system is configured to separate the received statement according to one or more of: the identified at least one clause, the identified at least one syntactic label, the identified at least one conjunction, the identified configuration information, the identified at least one pre-modifier or post-modifier, and the identified at least one relative qualifier.

In a further embodiment, the one or more words that can be used to create the questions include one or more of: who, why, when, what, where, and how.

In a further embodiment, to determine the confidence value, a second computing system receives and processes one or more questions of the one or more question and answer pair sets. The first computing system is configured to obtain one or more candidate responses from the second computing system. The first computing system is configured to compare the obtained candidate responses against one or more answers of the one or more question and answer pair sets in order to determine the confidence values of the one or more answers.

BRIEF DESCRIPTION OF THE DRAWINGS

The accompanying drawings are included to provide a further understanding of the present invention, and are incorporated in and constitute a part of this specification.

DETAILED DESCRIPTION

Figure 1:
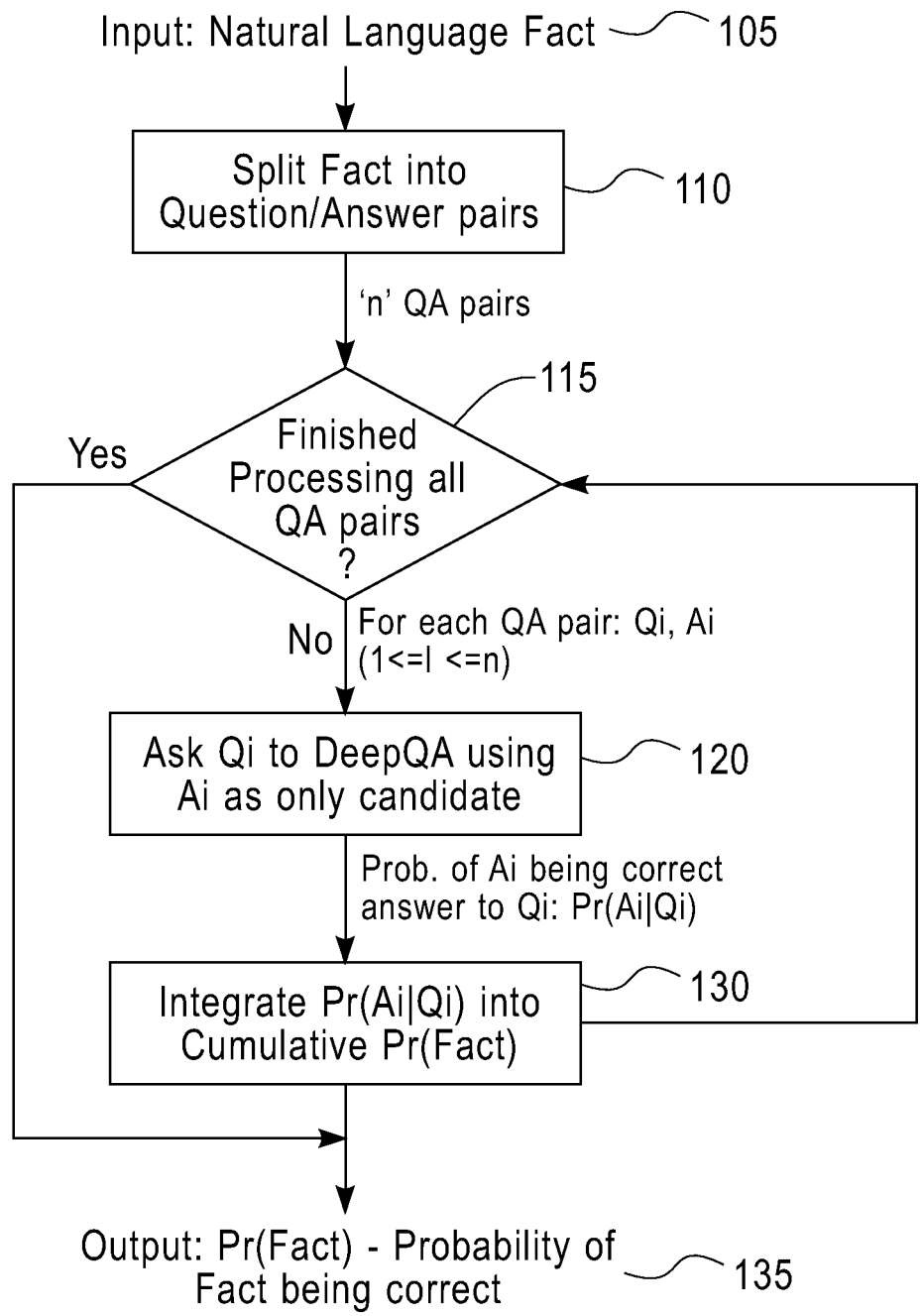
FIG. 1 is a flow chart that describes method steps for performing a fact checking in one embodiment.
Figure 3:
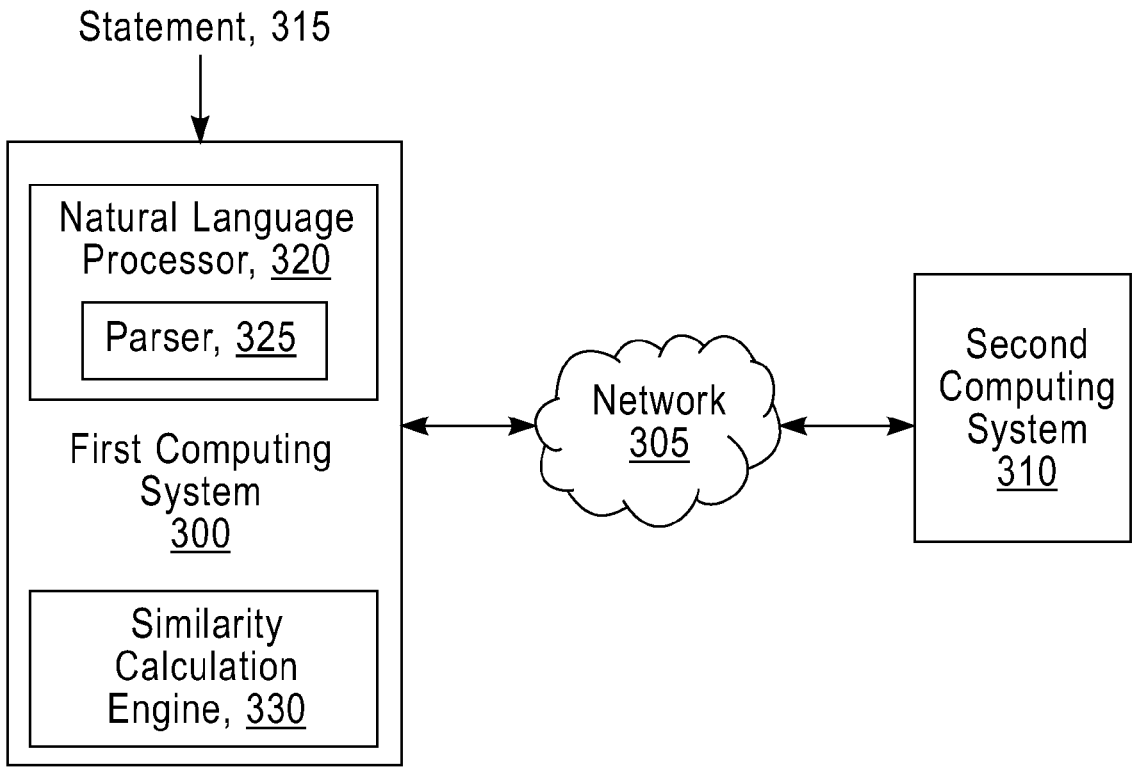
FIG. 3 is a system diagram for implementing the method steps described in FIG. 1 in one embodiment.

FIG. 1 is a flow chart that describes method steps for automatically performing a fact checking in one embodiment. FIG. 3 is a system diagram that illustrates an environment that implements the method steps described in FIG. 1 in one embodiment. At step 105 in FIG. 1, a first computing (e.g., a computing system 300 shown in FIG. 3) is configured to receive a text statement (e.g., a statement 315 shown in FIG. 3) entered by a user, e.g., via a keyboard or a remote input by the user, etc. In one embodiment, the statement is a fact typed in accordance with natural language (e.g., English, French, German, etc.). An example of an English statement includes, but is not limited to: "Daniel Defoe wrote the novel 'Robinson Crusoe' in 1971."

Returning to FIG. 1, at step 110, the first computing system is configured to decompose the received statement into one or more statements. In one embodiment, to decompose the received statement, a natural language processor 320 in the first computing system is configured to identify at least one clause in the received statement, and is configured to separate the received statement according to the identified at least one clause. Decomposing a statement is a process, which takes a given statement as a "complex" fact and identifies at least one clause within the statement. Each of the clause(s) is(are) evaluated for the truthfulness, e.g., by running a second computing system (e.g., a second computing system 310 shown in FIG. 3) with questions associated with these clauses. The confidences of the identified clause(s) are computed. Further, the computed confidences can be combined into a confidence value for the single complex fact.

This decomposition of the complex fact can be done, e.g., by a rule(s) or pattern(s) based on a syntactic parse of the given statement. For instance, a rule may use subordinate or relative clause boundaries of the received statement to decompose the received statement. For example, if a statement, "Baloo, a famous fictional character, who was introduced in 1894, has his name derived from the Hindi for 'bear'," is given, the first computing system is configured to decompose this statement as follows: "Baloo, a famous fictional character was introduced in 1894," and "Baloo, a famous fictional character, has his name derived from the Hindi for 'bear'." Then, as described below, the first computing system is configured to apply a question-answer pair generation and fact-checking (i.e., evaluating for the truthfulness) to each decomposed statement.

In another embodiment, the natural language processor 320 is configured to decompose the received statement, e.g., by performing one or more of: (1) identifying syntactic labels (e.g., "this," "that," etc.) in the received statement in which the syntactic labels are indicators for breaking a statement into two or more statements; (2) identifying a conjunction(s) (e.g., "and," "but," etc.) that connects two parallel statements; (3) identifying configuration information of the received statement that includes, but is not limited to: (a) a syntactic contour that shows a main clause and a subordinate clause characterize a same entity, (b) an indicative of a nested statement that focuses on one of several underspecified entities which do not share their facts; (4) identifying pre-modifiers (e.g., an adjective(s) in front of a named entity) and/or post-modifiers (e.g., an adjective(s) behind of a named entity) in the received statement which separate the received statement into one element and a statement; (5) identifying relative qualifiers (e.g., "the first," "only," "the westernmost," etc.) which need to be completed by information from elsewhere. The natural language processor 320 is configured to separate the received statement according to one or more of: the identified at least one clause, the identified at least one syntactic label, the identified at least one conjunction, the identified configuration information, the identified at least one pre-modifier or post-modifier, and the identified at least one relative qualifier.

For example, a first exemplary statement including a syntactic contour is "The name of this character, first introduced in 1894, comes from the Hindi for 'bear.' In this first exemplary statement, a focus is "this character." Thus, this first exemplary statement is decomposed into two separate statements: (1) "This character was first introduced in 1894."; (2) "The name of this character comes from the Hindi for 'bear.'" A second exemplary statement including an indicative of a nested statement is "A controversial 1979 war film was based on a 1902 work by this author." This second exemplary statement is decomposed into one element and one statement: (1) "a controversial 1979 war film"; (2) "[film] was based on a 1902 work by this author." A third exemplary statement including a pre-modifier is "To honor his work, this man's daughter took the name Maria Celeste when she became a nun in 1616." The focus in this third exemplary statement is "daughter." Thus, this third exemplary statement is decomposed into one element and a statement: (1) "this man's daughter"; (2) "To honor his work, [this] daughter took the name Maria Celeste when she became a nun in 1616."

A parser 325 in the first computing system is configured to identify words and phrases (named entities, dates, locations, nouns, verbs, etc.) in the decomposed or received statement, e.g., by a known syntactic parsing technique or evaluating lexical, syntactic and/or semantic properties of the identified words and phrases. The first computing system is configured to replace the identified words and phrases in the decomposed or received statement with one or more words that can be used to create questions in the one or more question and answer pair sets. In a further embodiment, the one or more words that can be used to create the questions include one or more of: who, why, when, what, where, and how. The first computing system is also configured to indicate the identified words and phrases in the decomposed or received statement as answers in the one or more question and answer pair sets.

For example, if the statement is "Daniel Defoe wrote the novel 'Robinson Crusoe' in 1971," a first question may be "who wrote the novel 'Robin Crusoe' in 1971," and a corresponding answer to the first question may be "Daniel Defoe," as obtained from the statement "Daniel Defoe wrote the novel 'Robinson Crusoe' in 1971." A second question may be "when did Daniel Defoe write the novel 'Robin Crusoe'?" A corresponding answer to the second question may be "1971," as obtained from the statement "Daniel Defoe wrote the novel 'Robinson Crusoe' in 1971." A third question may be "what did Daniel Defoe write in 1971?" A corresponding answer to the third question may be "novel 'Robinson Crusoe,'" as obtained from the statement "Daniel Defoe wrote the novel 'Robinson Crusoe' in 1971."

Returning to FIG. 1, at step 115, the first computing system starts to process each question and answer pair set (e.g., a first question may be "who wrote the novel 'Robin Crusoe' in 1971," and a corresponding answer to the first question may be "Daniel Defoe."). Specifically, at step 120 in FIG. 1, the first computing system is configured to determine a confidence value ("Pr(Ai|Qi)" shown in FIG. 1) of each answer in the question and answer pair sets. "Pr(Ai|Qi)" refers to a probability of Ai (an answer in question and answer pair sets) being a correct answer to Qi (a corresponding question in question and answer pair sets). A confidence value of an answer refers to a probability of a correctness of the answer to a corresponding question.

Figure 5:
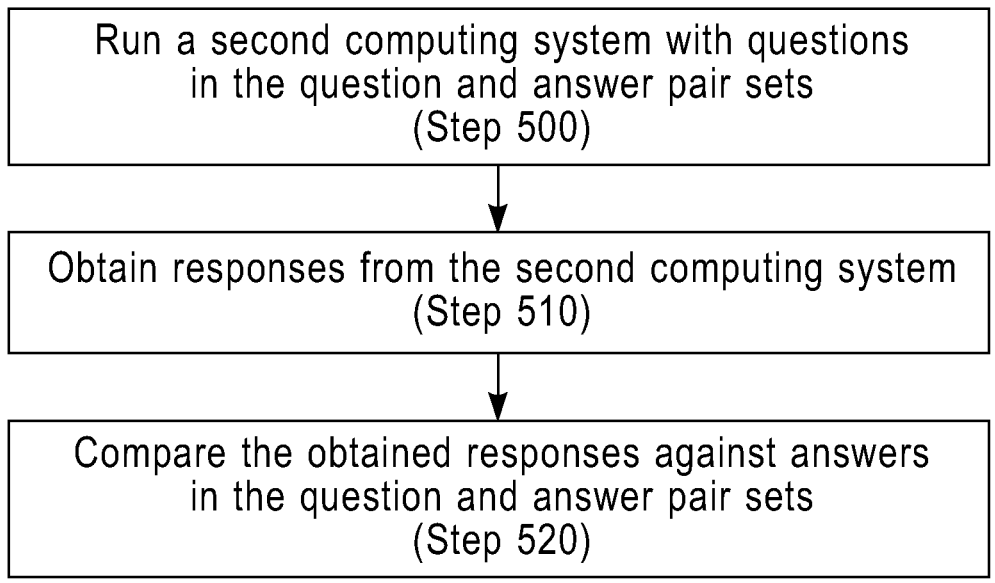
FIG. 5 is a flow chart that describes method steps for determining a confidence value of each answer in question and answer pair sets in another embodiment.

FIG. 5 is a flow chart that describes method steps for determining a confidence value of each answer in one embodiment. In this embodiment, at step 500, to determine the confidence value of each answer in the question and answer pair sets, the first computing system invokes a second computing system (e.g., a second computing system shown in FIG. 3) to run with corresponding questions of the question and answer pair sets. The first computing system may send the corresponding questions of the question and answer pair sets, e.g., via a network (e.g., a network 305 including, but not limited to: Intranet, Internet, Wireless communication network, Wired communication network, Satellite communication network, etc.) to the second computing system. The second computing system can process a natural language text and can provide answers to questions expressed in natural language. The second computing system includes, but is not limited to: an artificial intelligent computer, Watson ® Computer (trademark of International Business Machine, Inc.

Armonk, N.Y.), etc. In one embodiment, the first computing system and the second computing system are two different computing systems. In another embodiment, the first computing system and the second computing system are a single computing system. An artificial intelligent computer refers to an intelligent computing system adapted to perform a question answering (QA), natural language processing, data retrieval, logical reasoning, machine learning, etc, for example, as described in a currently-pending and commonly-owned US Patent Application, James Fan, et al., "System and Method for Providing Question and Answers with deferred type evaluation," U.S. patent application Ser. No. 12/126,642, wholly incorporated by reference as if set forth herein. A currently-pending and commonly-owned US Patent application, Ferrucci et al., "Evidence Evaluation System and Method based on Question and Answering," U.S. patent application Ser. No. 12/561,802, wholly incorporated by reference as if set forth herein, describes the Watson ® computer in detail. At step 510, after processing the corresponding questions, the second computing system generates one or more candidate responses (e.g., answers to the questions, etc.). Upon receiving the responses from the second computing system, the first computing system is configured to compare the generated candidate responses against the answers of the question and answer pair sets.

For example, the first computing system may send the second question, "when Daniel Defoe wrote the novel 'Robin Crusoe'," to the second computing system, e.g., via the network (e.g., the network 305 shown in FIG. 3) as a text format, string data structure format, etc. (Note that the corresponding answer to the second question is "1971" according to the question and answer pair set.) After processing the second question, the second computing system may respond with "1971." The second computing system sends the response "1971," e.g., via the network (e.g., the network 305 shown in FIG. 3) as a text format, string data structure, etc., to the first computing system. Then, the first computing system compares the corresponding answer "1971" and the response "1971" from the second computing system, e.g., by running a known similarity calculation engine (e.g., Alchemy API™ (trademark of Orchestr8 ®, LLC), similarity calculation engine 330 shown in FIG. 3, etc.) with the compared answer "1971" and the response "1971" from the second computing system. The similarity calculation engine outputs a confidence value higher than a pre-determined threshold value (e.g., 0.25), if the second computing system response is same as the compared answer or if the second computing system response includes the compared answer or if the compared answer includes the search engine response. In this example, since the second computing system response "1971" is same as the compared answer "1971," the compared answer receives, for example, "0.33" as its confidence value. However, if the second computing system response is different from the compared answer, e.g., the second computing system response do not include the compared answer or the compared answer do not include the second computing system response, the compared answer receives a confidence value (e.g., "0.02") lower than a pre-determined threshold value.

Figure 4:
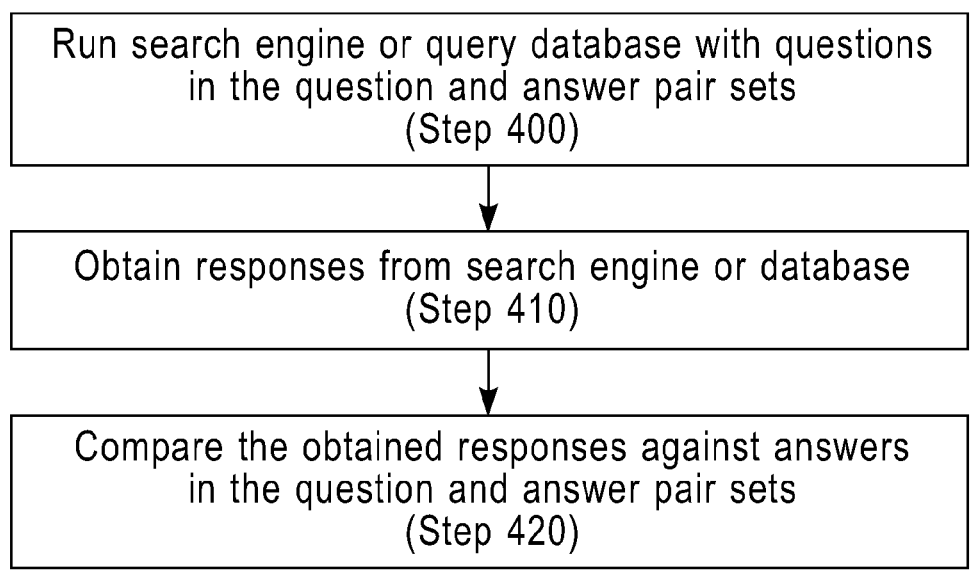
FIG. 4 is a flow chart that describes method steps for determining a confidence value of each answer in question and answer pair sets in one embodiment.

FIG. 4 is a flow chart that describes method step for determining a confidence value of each answer in another embodiment. In this embodiment, to determine the confidence value of each answer in the question and answer pair sets, at step 400, the first computing system is configured to run a search engine (e.g., Google ®, Yahoo! ®, Bing ® web sites) or query a database (e.g., IBM ® DB2, Oracle ®, etc.) with corresponding questions of the question and answer pair sets. For example, the first computing system may connect to a well-known search engine, e.g., by using a web browser (e.g., Mozilla ®, Firefox ®, Microsoft ® Internet Explorer ®, etc.) via HTTP protocol, automatically enter the corresponding question(s) on the web site of the search engine, and run the search engine with the entered question(s), e.g., by automatically clicking "search" button on the search engine web site. Alternatively, the first computing system may automatically create a SQL query corresponding to the questions and then send created SQL query to a database associated with the first computing system. Ritchie, et al., "Natural language interface to databases—an introduction," Natural Language Engineering 1 (1), pp. 29-81, 1995, Cambridge University Press, wholly incorporated by reference as if set forth herein, describes an automatic SQL query generation technique in detail. At step 410, the search engine or the database may generate one or more candidate responses (e.g., search results, answers to the queries, or answers to the questions, etc.). At step 420, upon receiving the responses from the search engine or the database, the first computing system is configured to compare the generated candidate responses to the answers of the question and answer pair sets.

For example, the first computing system may run a search engine with the first question, "who wrote the novel 'Robin Crusoe' in 1971?" (Note that the corresponding answer to the first question is "Daniel Defoe" according to the question and answer pair set.) In response to the first question, the search engine may respond with "Robinson Crusoe by Daniel Defoe." Then, the first computing system compares the corresponding answer "Daniel Defoe" and the response "Robinson Crusoe by Daniel Defoe" from the search engine, e.g., by running a known similarity calculation engine (e.g., Alchemy API™ (trademark of Orchestr8 ®, LLC), etc.) with "Daniel Defoe" and "Robinson Crusoe by Daniel Defoe." A reference to Jahannes Hoffart, et al., "Robust Disambiguation of Named Entities in Text," Proceeding of the 2011 Conference on Empirical Methods in Natural Languages Processing, pages 782-792, July, 2011, wholly incorporated by reference as if set forth herein, describes a technique for disambiguating named entities in a text. In one embodiment, the similarity calculation engine outputs a confidence value higher than a pre-determined threshold value (e.g., 0.25), if the search engine response is same as the compared answer or if the search engine response includes the compared answer or if the compared answer includes the search engine response. In this example, since the search engine response "Robinson Crusoe by Daniel Defoe" includes the compared answer "Daniel Defoe," the compared answer receives, for example, "0.33" as its confidence value. However, if the search engine response is different from the compared answer, e.g., the search engine response do not include the compared answer or the compared answer do not include the search engine response, the compared answer receives a confidence value (e.g., "0.02") lower than a pre-determined threshold value.

Returning to FIG. 1, the first computing system repeats steps 115-130 until confidence values of all the answers in the question and answer pair sets are determined. At step 130, the first computing system is configured to combine the determined confidence values. At step 135, the first computing system outputs the combined confidence values representing a probability that the received statement is evaluated as true. In one embodiment, to combine the determined confidence values, the first computing system is configured to multiply each said confidence value of answers in the question and answer pair sets. For example, assume that upon receiving a statement, the first computing system generated three question and answer pair sets regarding a statement, as described above. Further assume that a confidence value of the answer in the first question and answer pair set is 0.99, a confidence value of the answer in the second question and answer pair set is 0.99, and a confidence value of the answer in the third question and answer pair set is also 0.99. Then, the combined confidence value of the statement is 0.97=0.99×0.99×0.9. Thus, the probability that the statement is true is 97%.

Figure 6:
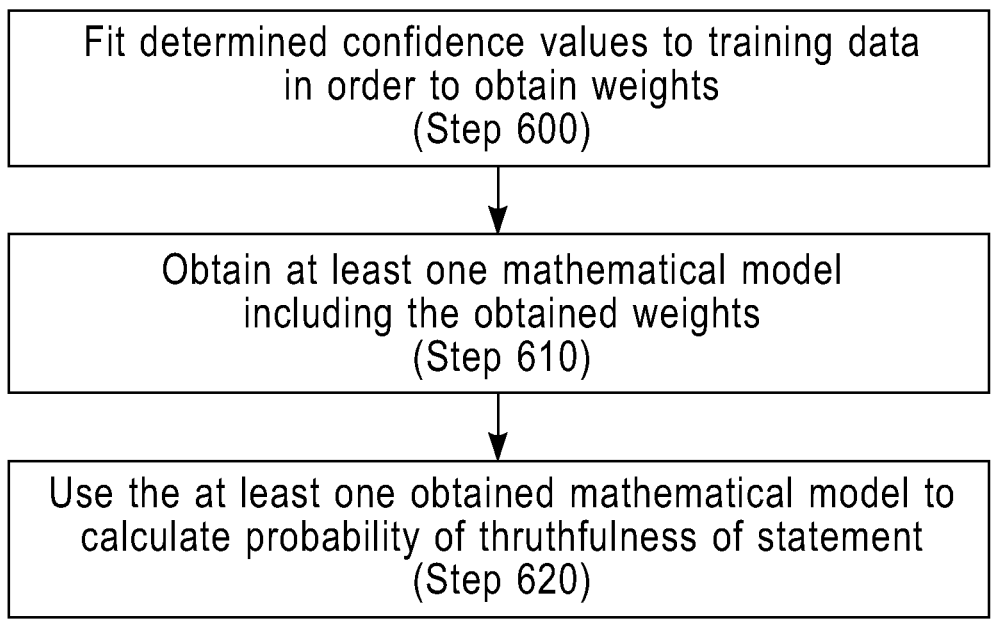
FIG. 6 is a flow chart that describes method steps for combining determined confidence values of answers in question and answer pair sets in one embodiment.

FIG. 6 is a flow chart that describes method steps for combining determined confidence values in another embodiment. In this embodiment, at step 600, to combine the determined confidence values, the first computing system is configured to fit the determined confidence values of answers in the question and answer pair sets to training data with all true facts (i.e., statements being evaluated as true), e.g., by using a machine learning technique or a regression technique, in order to obtain weights associated with the determined confidence values. The machine learning technique includes, but is not limited to: a Bayesian network, supervised learning, unsupervised learning, and decision tree. The regression technique includes, but is not limited to: a linear regression, a logistic regression, a non-linear regression. For example, given a set of confidence values, the first computing system obtains weights $w_1, \ldots, w_n$ by fitting the confidence values to the training data set. At step 610, the first computing system is configured to obtain at least one mathematical model that includes the obtained weights, for example, $Z=w_1 \times x_1 + w_2 \times x_2 + \ldots w_n \times x_n$ and $f(Z)=1/(1+e\hat{\ }(-Z))$, where $f(Z)$ represents a probability of truthfulness of a statement associated with the determined confidence values, and the summation of weights $w_1, w_2, w_3, \ldots, w_n$ is 1. At step 620, the first computing system is configured to use the mathematical formula(s) to calculate a probability of truthfulness of that statement, e.g., by calculating $f(Z)=1/(1+e\hat{\ }(-Z))$, where $Z=w_1 \times x_1 + w_2 \times x_2 + \ldots w_n \times x_n$, where $x_1, \ldots, x_n$ are the determined confidence values, and $w_1, \ldots, w_n$ are the obtained weights.

For example, assume that upon receiving a statement, the first computing system generated three question and answer pair sets regarding the statement, as described above. Further assume that a confidence value of the answer in the first question and answer pair set is 0.01, a confidence value of the answer in the second question and answer pair set is 0.33, and a confidence value of the answer in the third question and answer pair set is also 0.01. Further assume that $w_1$ is 0.25, $w_2$ is 0.70, and $w_3$ is 0.05. Then, Z is calculated as follows: 0.25×0.01+0.70×0.33+0.05×0.01=0.234. The confidence value of the statement is calculated as follows: $1/(1+e^{-0.234})=0.558$. Thus, in this example, the probability that the statement is true is about 56%.

In one embodiment, the first computing system and the second computing system can be used to answer to a specific question. For example, the first computing system receives a statement "Who was the President of the United States when '60 Minutes' premiered?" from a user, e.g., by the user typing a keyboard. The first computing system decomposes this statement into, for example, two questions: the first question—"when did '60 Minutes' premiered?"; the second question—"who was the US president when [insert answer of the first question]?" Then, the first computing system first sends the first question to the second computing system, e.g., via a communication network between the first computing system and the second computing system, to obtain an answer to the first question, e.g., by processing the first questions at the second computing system, which implements QA functionality for determining candidate responses in a manner as described in a currently-pending and commonly-owned US patent application whose Ser. No. is 12/126,642, which is wholly incorporated by reference as if set forth herein. Then, the second computing system provides the answer to the first question to the first computing system, e.g., via the network between the first computing system and the second computing system. Then, the first computing system revises the second question with the answer to the first question. The first computing system sends the revised second question to the second computing system, e.g., via the network, in order to obtain a certain number of candidate responses to the revised second question, e.g., by processing the revised second question at the second computing system, which implements QA functionality for determining candidate responses in a manner as described in a currently-pending and commonly-owned US patent application whose Ser. No. is 12/126,642.

For example, the second computing system may provide an answer to the first question to the first computing system as follows: "1968." Then, the first computing system sends the revised second question, for example, "who was the US president in 1968?" to the second computing system. By processing the revised second question "who was the US president in 1968," the second computing system sends responses, "JFK was President in 1968" and "LBJ was President in 1968." to the first computing system. Upon receiving these responses from the second computing system, the first computing system creates, e.g., by combining these responses with the original statement, additional statements that need fact checking: a first statement "JFK was the President of the United States when '60 Minutes' premiered," and a second statement "LBJ was the President of the United States when '60 Minutes' premiered." The first computing system evaluates the confidence value of the first statement "JFK was the President of the United States when '60 Minutes' premiered," e.g., by running the method steps in FIG. 1. The first computing system also evaluates the confidence value of the second statement "LBJ was the President of the United States when '60 Minutes' premiered," e.g., by running method steps in FIG. 1. In this example, the second statement may obtain higher confidence value over the first statement. Thus, second statement is more likely to be true than the first statement.

Figure 7:
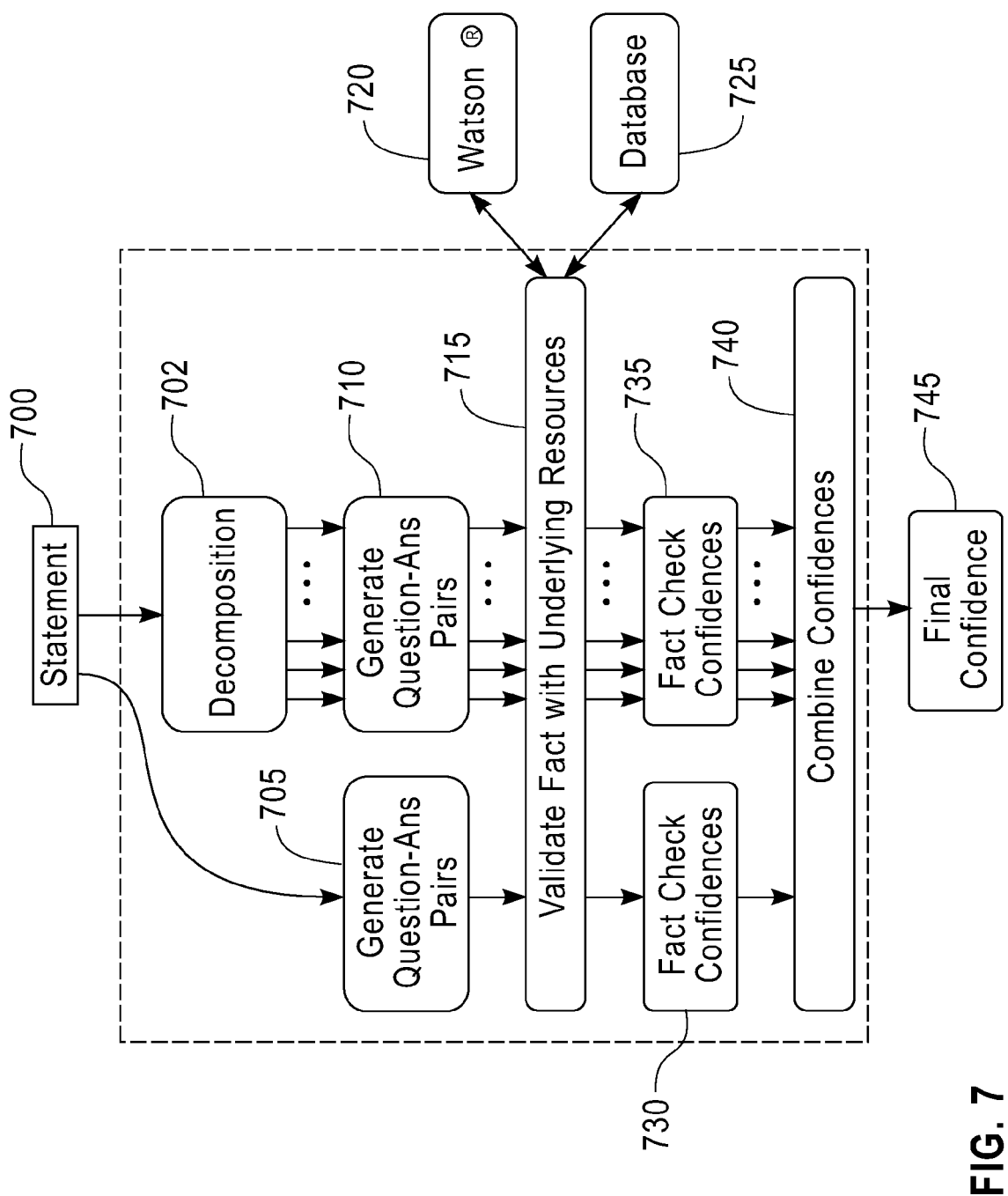
FIG. 7 is a flow chart that illustrates method steps for performing a fact checking in a further embodiment.

FIG. 7 is a flow chart that illustrates method steps for performing a fact checking in an additional embodiment. At step 700, the first computing system (e.g., the first computing system 300 shown in FIG. 3) receives a statement (e.g., "Baloo, a famous fictional character, who was introduced in 1894, has his name derived from the Hindi for 'bear.'"). At step 702, optionally, the natural language processor (e.g., natural language processor 320 shown in FIG. 3) decomposes the statement, e.g., by identifying one or more of: at least one clause in the received statement, at least one syntactic label in the received statement, at least one conjunction in the received statement, configuration information in the received statement, at least one pre-modifier or post-modifier in the received statement, and at least one relative qualifier in the received statement, and then by separating the received statement according to one or more of: the identified at least one clause, the identified at least one syntactic label, the identified at least one conjunction, the identified configuration information, the identified at least one pre-modifier or post-modifier, and the identified at least one relative qualifier. For example, the natural language processor decomposes "Baloo, a famous fictional character, who was introduced in 1894, has his name derived from the Hindi for 'bear'" as "Baloo, a famous fictional character was introduced in 1894" and "Baloo, a famous fictional character, has his name derived from the Hindi for 'bear.'"

At steps 705-710, the first computing system generates question and answer pair sets based on the statement received at step 710 or based on the decomposed statement at step 702, e.g., by identifying named entities, dates, words, and phrases in the received or decomposed statement. For example, if the statement received at step 710 is "Ayn Rand wrote Atlas Shrugged in 1957." The parser (e.g., parser 325 shown in FIG. 3) in the first computing system identifies named entities (e.g., "Ayn Rand" and "Atlas Shrugged") and a date ("1957") in the statement, e.g., by using a known syntactic parsing technique or by using a known part-of-speech tagger (e.g., Stanford Log-linear Part-Of-Speech Tagger, http://nlp.stanford.edu/software/tagger.shtml, etc.) or by using a named entity detection system which identifies named entities in a statement. The named entities, dates, words and phrases are answers in the question and answer pair sets. The first computing system generates questions in the question and answer pair sets, e.g., by replacing the named entities, dates, words and phrases in the statement with "when," "who," "which," etc. For example, upon receiving "Ayn Rand wrote Atlas Shrugged in 1957" as a statement, the first computing system generates a question, "who wrote Atlas Shrugged in 1957" and its corresponding answer "Ayn Rand" as a question and answer pair set.

Returning to FIG. 7, at step 715, the first computing system validates answers in the question and answer pair sets. For example, the first computing system sends a question in a question and answer pair set to the second computing system (e.g., Watson ® computer 720 shown in FIG. 7) and obtains a corresponding response from the second computing system. Then, the first computing system compares the obtained response against the corresponding answer in the question and answer pair set. In another example, the first computing system may run a database or search engine 725 with a question in a question and answer pair set and retrieve a corresponding response from the database or the search engine. Then, the computing system compares the retrieved response against the corresponding answer in the question and answer pair set.

At steps 730-735, the first computing system determines a confidence value of an answer in each question and answer pair set, e.g., by calculating a similarity between the obtained or retrieved response and the corresponding answer by using the similarity calculation engine 330 shown in FIG. 3. At step 740, the first computing system combines confidence values of answers in the question and answer pair sets, e.g., by using a regression technique or by multiplying a confidence value of each answer. At step 745, the combined confidence value becomes a final confidence value that represents the probability that the statement received at step 700 is true.

Figure 2:
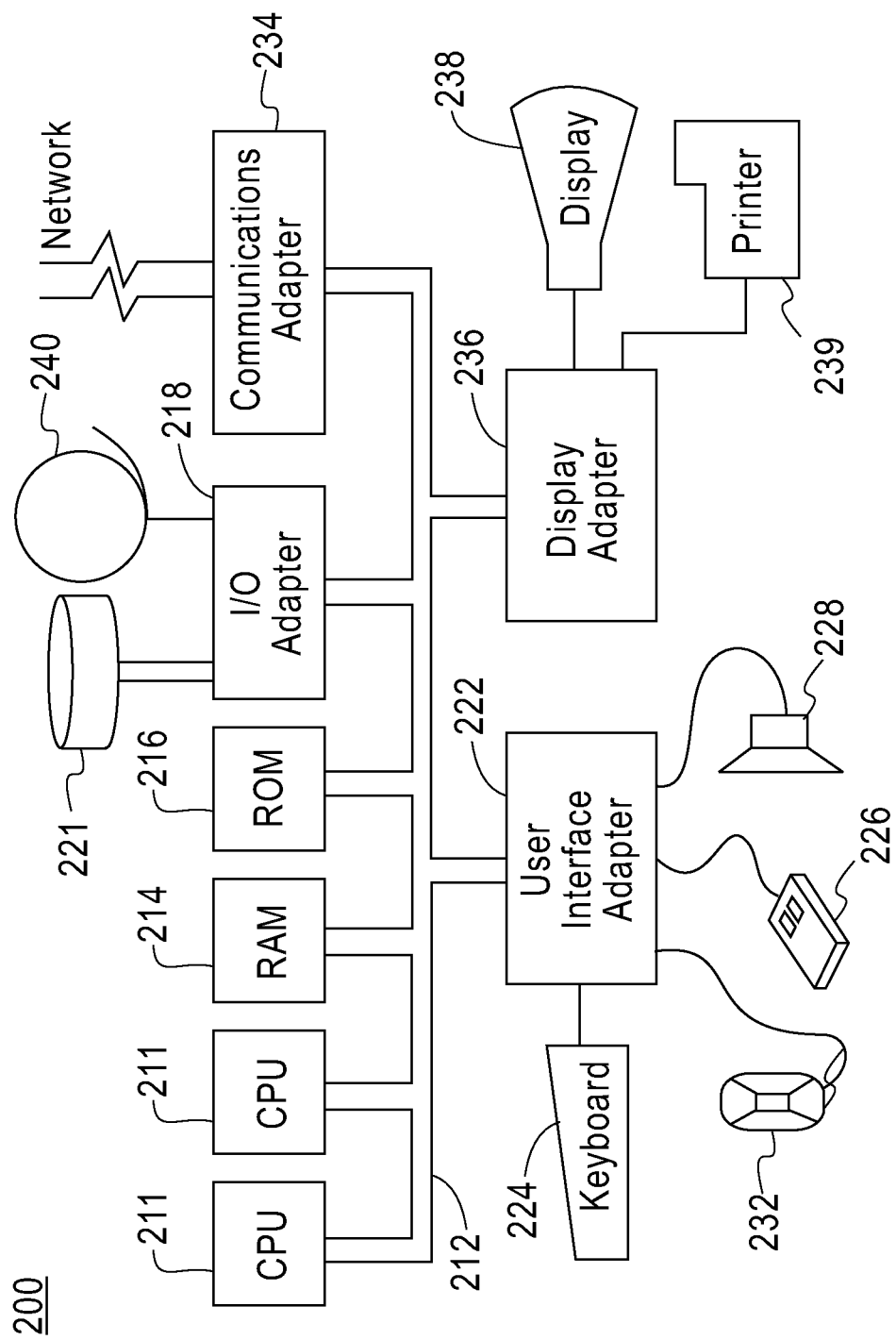
FIG. 2 illustrates an exemplary hardware configuration for performing the fact checking in one embodiment.

FIG. 2 illustrates an exemplary hardware configuration of the computing system 200. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for verifying a statement, the system comprising:
    a first computing system including at least one memory device and at least one processor connected to the memory device, wherein the first computing system is configured to:
    receive a statement;
    decompose the received statement into one or more sets of question and answer pairs;
    determine a confidence value of each answer in the one or more question and answer pair sets; and
    combine the determined confidence values, the combined confidence values representing a probability that the received statement is evaluated as correct,
    wherein in order to combine the determined confidence values, the first computing system is further configured to:
    fit the determined confidence values to training data in order to obtain weights associated with the determined confidence values;
    obtain, based on the fitting, weights associated with the determined confidence values; and
        obtain a mathematical model, $Z = w_1 xx_1 + w_2 xx_2 + \ldots + w_n xx_n$, $f(Z) = 1/(1+e^{\wedge}(-Z))$, where $w_1, w_2, \ldots, w_n$, are the obtained weights, $x_1\ x_2 \ldots, x_n$ are the determined confidence values, and $f(Z)$ represents a probability of correctness of a statement associated with the determined confidence values.

2. The system according to claim 1, further comprising:
    identify words and phrases in the received statement;
    replace the identified words and phrases in the received statement with one or more words that can be used to create questions in the one or more question and answer pair sets; and
    indicate the identified words and phrases in the received statement as answers in the one or more question and answer pair sets.

3. The system according to claim 2, where in the one or more words that can be used to create the questions include one or more of: who, why, when, what, where, and how.

4. The system according to claim 1, wherein to decompose the received statement, the first computing system is configured to identify one or more of: at least one clause in the received statement, at least one syntactic label in the received statement, at least one conjunction in the received statement, configuration information in the received statement, at least one pre-modifier or post-modifier in the received statement, and at least one relative qualifier in the received statement, and
    the first computing system is further configured to separate the received statement according to one or more of: the identified at least one clause, the identified at least one syntactic label, the identified at least one conjunction, the identified configuration information, the identified at least one pre-modifier or post-modifier, and the identified at least one relative qualifier.

5. The system according to claim 1, wherein to determine the confidence value, the first computing system is configured to:
    run a search engine or querying a database with one or more questions of the one or more question and answer pair sets;
    obtain one or more candidate responses from the search engine or the database; and
    compare the obtained candidate responses to one or more answers of the one or more question and answer pair sets.

6. The system according to claim 1, wherein to determine the confidence value, the first computing system is configured to:
    run a second computing system with one or more questions of the one or more question and answer pair sets;
    obtain one or more candidate responses from the second computing system; and
    compare the obtained candidate responses to one or more answers of the one or more question and answer pair sets.

7. The system according to claim 1, wherein to combine the determined confidence values, the first computing system is configured to: multiply each said confidence value.

8. A computer program product for verifying a statement, the computer program product comprising a non-transitory storage medium readable by a processing circuit and storing instructions run by the processing circuit for performing a method, the method comprising:
    receiving, at a first computing system including at least one memory device and at least one processor connected to the memory device, a statement;
    decomposing the received statement, by the first computing system, into one or more sets of question and answer pairs;
    determining, by the first computing system, a confidence value of each answer in the one or more question and answer pair sets; and
    combining, by the first computing system, the determined confidence values, the combined confidence values representing a probability that the received statement is evaluated as true, the combining including:
        fitting the determined confidence value of the each answer in the question and answer pair sets to training data having statements predetermined as correct;

obtaining, based on the fitting, weights associated with the determined confidence values; and obtaining, by using the obtained weights and the determined confidence values, a mathematical model, $Z = w_1 x x_1 + w_2 x x_2 + \ldots + w_n x x_n$, $f(Z) = 1/(1 + e^{\wedge}(-Z))$, where $w_1, w_2, \ldots, w_n$ are the obtained weights, $x_1, x_2, \ldots, x_n$ are the determined confidence values, and $f(Z)$ represents the probability of correctness of the statement associated with the determined confidence values.

9. The computer program product according to claim 8, wherein the step of determining includes:

running a second computing system with one or more questions of the one or more question and answer pair sets;

obtaining one or more candidate responses from the second computing system; and comparing the obtained candidate responses to one or more answers of the one or more question and answer pair sets.

\* \* \* \* \*